Figure 1:
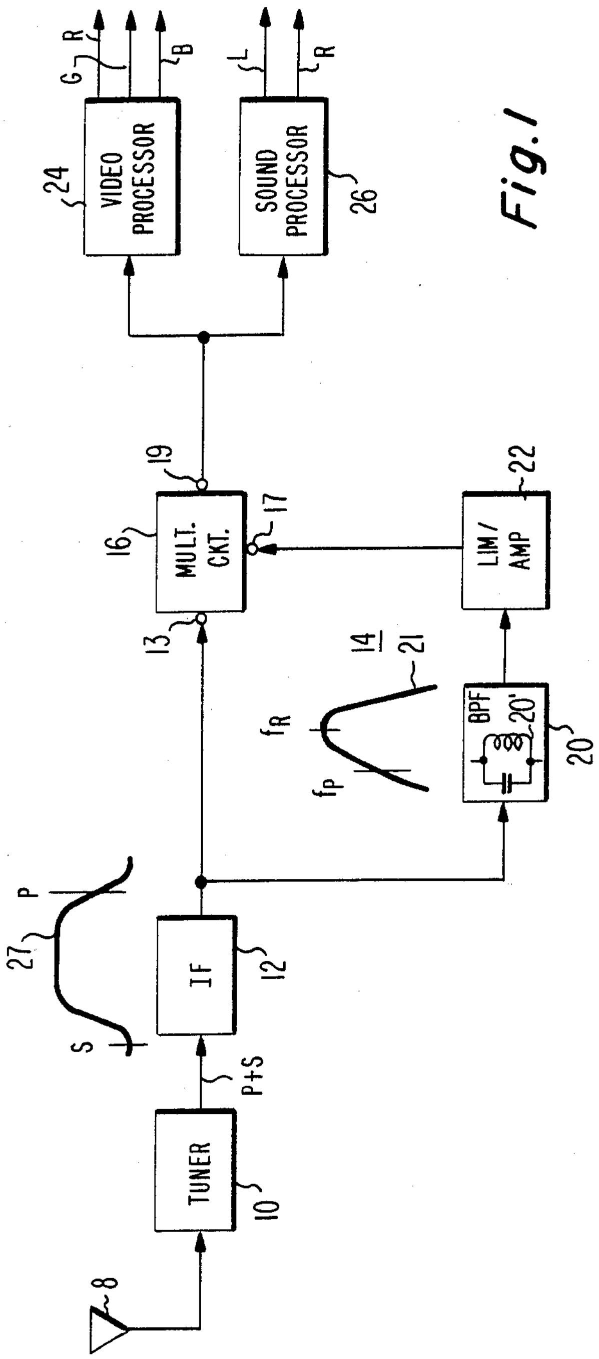

United States Patent [19]

Patel

[11] Patent Number: 4,513,323

[45] Date of Patent: Apr. 23, 1985

[54] BUZZ REDUCTION FOR INTERCARRIER TYPE TELEVISION SOUND DETECTION

[75] Inventor: Chandrakant B. Patel, Hopewell, N.J.

[73] Assignee: RCA Corporation, New York, N.Y.

[21] Appl. No.: 445,485

[22] Filed: Nov. 30, 1982

[51] Int. Cl.[3] ........................ H04N 5/62; H04N 5/60

[52] U.S. Cl. .................................... 358/197; 358/198

[58] Field of Search ............... 358/197, 198, 167, 177, 358/36, 144; 329/135, 167, 50, 145; 455/308, 337, 339

[56] References Cited

U.S. PATENT DOCUMENTS

| | | | |
|---|---|---|---|
| 4,163,196 | 7/1979 | Hongu et al. | 455/337 |
| 4,237,485 | 12/1980 | Saito et al. | 358/197 |
| 4,263,611 | 4/1981 | Gibson | 358/23 |
| 4,349,842 | 9/1982 | Apeldoorn et al. | 358/197 |

FOREIGN PATENT DOCUMENTS

| | | | |
|---|---|---|---|
| 56-93490 | 7/1981 | Japan | 358/197 |

OTHER PUBLICATIONS

"RCA Television Service Data", Chassis CTC 108 Series, p. 25.

*Primary Examiner*—Tommy P. Chin
*Assistant Examiner*—Michael D. Parker
*Attorney, Agent, or Firm*—Eugene M. Whitacre; Peter M. Emanuel; Lawrence C. Edelman

[57] ABSTRACT

A television receiver in which a modulated IF picture carrier, after passing through a sloped attenuation region of an IF amplifying stage, is used to produce an intercarrier sound signal. An audio buzz reduction system is provided in which phase modulation of the IF picture carrier caused by the slope of the IF stage is prevented from being transferred to the intercarrier sound signal by passing the modulated IF picture carrier through an oppositely sloped attenuation portion of a filter before it is used to generate the intercarrier sound signal.

7 Claims, 3 Drawing Figures

BUZZ REDUCTION FOR INTERCARRIER TYPE TELEVISION SOUND DETECTION

The present invention relates to television sound signal processing and, in particular, to an intercarrier-type sound signal detector including a filter for selecting the television signal picture carrier in a manner which reduces buzz in the reproduced audio program.

Multichannel audio for stereo and bi-lingual broadcasting involves the use of one or more audio subcarriers for forming a composite audio signal. The composite signal requires that the television audio signal bandwidth be increased to approximately 90 kHz or more as compared with the 15 kHz bandwidth for a monophonic audio program. As a result, the bandwidth of the sound processing channel of the television receiver must be increased and an audio buzz which is produced in the sound signal processing channel tends to be more severe.

Audio buzz, which may be defined as the result of picture-related modulation which is transferred to the audio signal, has always been present to some degree in television signal processing circuitry, but has been kept to within tolerable limits by various circuit techniques.

In the conventional intercarrier sound detector, the picture and sound carriers are processed after the tuner in a common IF channel. This IF channel includes an IF bandpass response having a particular shape which locates the IF picture carrier 6 DB down on the high frequency slope portion of the IF passband and the IF sound carrier approximately 20 dB down on the lower frequency slope portion. The picture information amplitude modulated on the greater amplitude picture carrier is detected by an envelop or synchronous detector and thereafter processed in a video channel. To recover the frequency modulated audio information, the two IF carriers are mixed to form an intercarrier sound signal having a frequency corresponding to the difference of the carrier IF frequencies. E.g., for the NTSC system a 45.75 MHz picture carrier is mixed with a 41.25 MHz sound carrier for producing a 4.5 MHz intercarrier sound signal. The frequency modulated intercarrier sound signal is then demodulated by an FM detector to produce the audio information.

Although the above-noted intercarrier IF passband response is necessary for proper detection of the vestigial sideband picture signal, its use tends to generate audio buzz for a variety of reasons, a major reason being the unequal attenuation the negative sloped portion of the IF response imparts to the upper and lower sidebands of the double sideband portion of the modulated IF picture carrier. This unequal sideband attenuation generates a phase modulation (PM) of the picture carrier, commonly referred to as "Nyquist slope PM", which is transferred to and therefore distorts the sound signal because of the intercarrier mixing process.

The audio buzz produced by the intercarrier system can be tolerated in monophonic audio television receivers due to the relatively narrow passband of the sound channel in such receivers. Unfortunately, with the increased audio bandwidth required for multichannel audio, the audio buzz is also increased and may no longer be within tolerable limits.

U.S. Pat. No. 4,237,489 issued in the name of Hiroshi Saito, et al., on Dec. 2, 1980 describes a system for cancelling buzz in a television intercarrier sound detector system which includes a buzz cancelling signal generator for detecting a phase-modulated component of the detected video signal and generating therefrom a buzz cancelling signal which is then added to the demodulated audio signals for reducing the audio buzz. This approach is undesirable since it requires additional signal processing circuitry separate from the picture and sound signal processing circuits for generating a buzzcancelling signal and additional circuitry for combining the cancelling signal with the audio signals in a manner which reduces the audio buzz.

The present invention concerns an intercarrier sound signal detector of the type including a multiplier circuit responsive to the IF sound carrier and a switching control signal derived from the modulated IF picture carrier for detecting the intercarrier sound signal with provisions for reducing audio buzz. Specifically, in accordance with the present invention, the switching control signal generating circuit for the detector includes a tuned circuit for selecting the IF picture carrier but having a resonant frequency greater than the frequency of the IF picture carrier and providing a sloped attenuation to the double sideband portion of the vestigial sideband IF picture carrier which is opposite to the sloped attenuation imparted to the double sideband portion of the IF picture carrier by the IF response of the television receiver. Due to the frequency offset of the tuned circuit of the control signal generating circuit, the PM induced by the IF response is compensated for resulting in a reduced audio buzz.

Figure 2A:
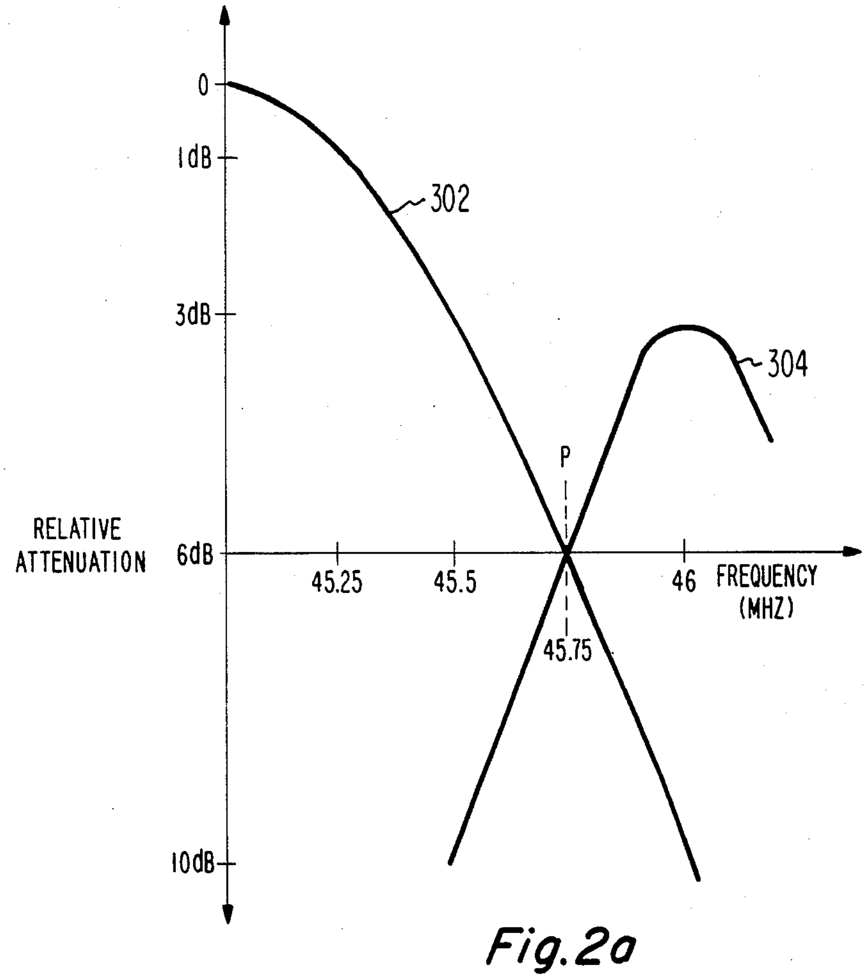
Figure 2B:
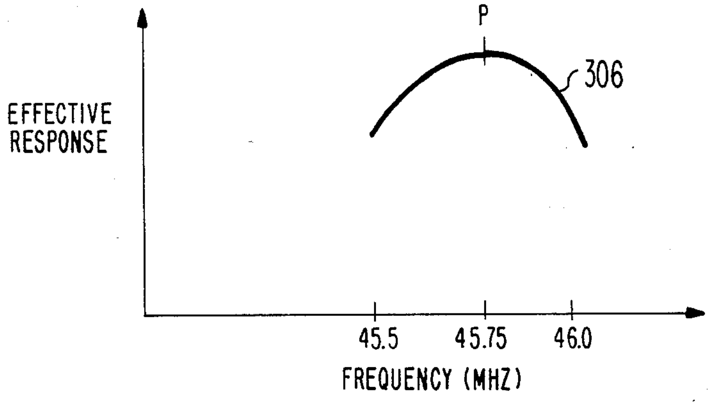

In the drawings:

FIG. 1 illustrates in block diagram form a television receiver including an intercarrier sound signal detector in accordance with the principles of the present invention; and FIGS. 2(*a*) and 2(*b*) graphically illustrate filter response characteristics helpful in understanding the principles of the invention.

Referring to FIG. 1, a television broadcast signal received by an antenna 8 is applied to a television tuner 10. Tuner 10 selectively translates the RF signal of a selected TV channel to an intermediate frequency (IF) signal including picture (P) and sound (S) carriers at, e.g., 45.75 MHz and 41.25 MHz, respectively, in the NTSC system. The IF picture carrier is basically an amplitude modulated (AM) signal containing the composite video information. The IF sound carrier, on the other hand, is a frequency modulated (FM) signal. A conventional IF amplifying stage 12 filters and amplifies the IF picture and sound carriers and applies them to a synchronous detector 14 for detecting the video information and an intercarrier sound signal.

Synchronous detector 14 includes a multiplier circuit 16 responsive to the IF picture and sound carriers at an input terminal 13 and a switching control signal at an input terminal 17 for operating, in a well known manner, as a detector for demodulating the amplitude modulated video information to produce a video signal and also as a mixer for generating the intercarrier sound signal. A composite signal including both the video signal and the intercarrier sound signal are provided at a multiplier output terminal 19. A bandpass filter (BPF) 20 has a passband response 21 for selecting the IF picture carrier from the IF signal. A limiter/amplifier 22, responsive to the output of BPF 20, generates the switching control signal from the selected portion of the IF signal. Multiplier 16 and limiter/amplifier 22 are conventional in nature and can be constructed in a single integrated circuit chip using differential amplifiers operating as a synchronous detector such as described in U.S. Pat. No. 4,263,611, issued in the name of Walter Gibson, et al., on Apr. 21, 1981. The construction and passband response of BPF 20 will be discussed in greater detail later on.

A video processor 24 of conventional construction and operation is responsive to the video signal at terminal 19 for deriving red (R), green (G) and blue (B) color video signals which are applied to a kinescope (not shown) for reproducing a color image of a televised scene. A sound processor 26 is responsive to the intercarrier sound signal at terminal 19 for detecting, for example, a stereophonic multichannel signal and deriving therefrom left and right audio signals which are applied to speakers (not shown) for reproducing a stereophonic audio program. The construction details of sound detector 26 will vary depending upon the broadcast standards of transmitted television multichannel audio signal. By way of example, one television multichannel audio transmission system and a corresponding sound signal detector is described in U.S. Pat. No. 4,339,772, issued in the name of Carl Eilers, et al., on July 13, 1982. However, it is noted that the present invention may be used with any of the known multichannel audio transmission systems.

IF stage 12 has a conventional passband response 27 in which the IF sound carrier S is located approximately 20 dB down on the lower frequency slope of the response so that the video information can be detected without significant interference from the sound carrier. The AM modulated picture carrier is a vestigial sideband signal which contains the video information in an upper sideband portion having a full bandwidth and a lower sideband portion having a smaller bandwidth of approximately 750 KHz. Thus, video signals with frequencies up to 750 KHz are transmitted as double sideband (DSB) signals while video signals with higher frequencies are transmitted as single sideband signals. Since a DSB signal has twice the effective modulation as a single sideband signal, the IF picture carrier P is located 6 DB down on the higher frequency slope of IF passband response 27. This effectively attenuates the DSB portion of the picture signal by fifty percent (6 dB) and equalizes its effective modulation with that of the single sideband portion.

Unfortunately, IF passband response 27 induces what is called a "Nyquist slope" phase modulation (PM) to the IF picture carrier due to its asymmetrical attenuation of the upper and lower sidebands of the DSB portion of the IF picture carrier. In the intercarrier type sound detection system wherein the IF picture carrier, or a switching signal derived therefrom, is mixed with the IF sound carrier to produce an intercarrier sound signal, this Nyquist slope induced PM results in distortion of the frequency modulated intercarrier sound signal and buzz in the reproduced audio program.

The amount of audio buzz caused by the induced PM increases in direct relationship with increases in the bandwidth of the audio signal. Thus, when one considers that the bandwidth of a composite audio signal including, for example, multiple subcarriers for the transmission of monophonic, stereophonic and additional audio programs, is significantly greater than the bandwidth of a monophonic signal conventionally processed by an intercarrier system, it becomes apparent that the audio buzz will be substantially increased.

In accordance with the present invention, the passband response 21 of bandpass filter 20 for selecting the IF picture carrier from the output of IF stage 12 has a resonant frequency $f_R$ greater than the frequency of the picture carrier $f_P$ in order to provide a sloped attenuation to the double sideband portion of the IF picture carrier signal which is opposite to the previously noted sloped attenuation provided to the double sideband portion of the IF picture carrier by response 27 of IF stage 12.

Referring to FIG. 2(*a*), a response curve 302 illustrates the upper frequency, negative slope, portion of IF response 27. Response 304, which is the type of response provided by bandpass filter 20 for selecting the IF picture carrier to generate the switching control signal, is shown on the same axis as response curve 302. As previously noted, the shape of response 302 is chosen to attenuate the DSB portion of the modulated picture carrier 6 dB to equalize its modulation amplitude with that of the single sideband portion and imparts an unequal attenuation to the DSB portion of the modulated picture carrier (i.e., ±750 KHz from 45.75 MHz in the NTSC system). This unequal attenuation of the DSB portions phase-modulates the switching control signal developed at the output of limiting amplifier 22 and produces an unwanted distortion in the intercarrier signal produced at the output of multiplier 16 which results in the audio buzz.

As more clearly shown in FIG. 2(*a*), response 304 has a bandwidth and center frequency for subjecting the DSB portion of the modulated picture carrier to a sloped attenuation response of opposite polarity of that presented by response 302. In order to provide response 304, bandpass filter 20 may simply comprise a parallel resonant LC circuit 20' tuned to a frequency slightly greater than the IF picture carrier frequency. This locates the DSB portion of the modulated IF picture carrier on the positive slope portion of the bandpass filter response. In this manner, the unequal attenuation of the DSB portion of the modulated picture carrier caused by the IF stage 12 is cancelled or compensated for before limiting amplifier 22 generates the switching control signal from the IF picture carrier. Since a major contributor to Nyquist type audio buzz is low frequency video signals having large amplitude, such as the horizontal synchronizing signal, it is sufficient to compensate for sideband attenuation out to approximately the seventh harmonic of the horizontal synchronizing signal. In the illustrated embodiment bandpass filter 20 has a center frequency of about 46.0 MHz and a 3dB bandwidth of about 500 KHz. The net effect of responses 302 and 304 upon the IF picture carrier is shown in FIG. 2(*b*) as waveform 306. Note that effective response 306 provides symmetrical attenuation within the frequency range of the DSB portion of the modulated IF picture carrier and thus provides equal attenuation to the sidebands within ±250 KHz of the IF picture carrier frequency. This is more than sufficient to prevent the Nyquist type of audio buzz.

Thus, the present invention allows the use of a common amplifying stage for the IF picture and sound carriers which does not generate increased audio buzz when processing a wide bandwidth audio signal. Furthermore, a common detector can follow the IF stage for developing the video and intercarrier audio signals in a conventional manner. Thus, conventional television circuits, which are commercially available in an integrated circuit form, can be used for generating the intercarrier sound signal. The only change required to prevent increased Nyquist type audio buzz is the readjustment of the picture bandpass filter.

Although in the illustrated embodiment, a common synchronous detector 14 is used to generate the video information and the intercarrier sound signal, the invention is equally applicable to an intercarrier-type sound detector which is separate from the video information detector. Furthermore, it should be noted that even the IF picture carrier used for detecting the intercarrier signals is not subjected to IF filter response 27, the invention could still be advantageous for reducing the unequal attenuation of the DSB portion of the IF picture carrier which is caused by the selectivity of tuner 10. Although the selectivity of tuner 10 typically provides only one or two dB of sloped attenuation at the DSB portion of the picture carrier, the small amount of audio buzz caused by this unequal sideband attenuation can also be cancelled by adjustment of the filter response for bandpass filter 20 in accordance with the principles of this invention.

What is claimed is:

1. In a television receiver including means for providing an intermediate frequency (IF) signal including an IF sound carrier frequency modulated (FM) with multichannel audio information and an IF picture carrier amplitude modulated (AM) with video information and including a double sideband (DSB) portion, said means for providing said IF signal having a filter response characteristic with a sloped attenuation portion of a given polarity which causes unequal attenuation to upper and lower sidebands of said DSB portion whereby said unequally attenuated sidebands impart an undesired phase modulation to said IF picture carrier, an intercarrier multichannel sound signal detector comprising:

a multiplier having a first input coupled to receive at least said FM modulated IF sound carrier and a second input coupled to receive a switching control signal for multiplying said signals applied to said first and second inputs and providing at an output an intercarrier multichannel sound signal;

stereo sound processing means responsive to said multichannel intercarrier sound signal for producing left and right stereo sound signals; and a switching control signal generating circuit coupled between said means for providing said video IF signal and said multiplier second input and responsive to said AM modulated IF picture carrier for generating said switching control signal;

said switching control signal generating circuit including filter means for presenting a sloped attenuation response characteristic to said AM modulated IF picture carrier of a polarity opposite said given polarity of said filter response characteristic of said means for providing said IF signal so that said switching control signal has substantially equal amplitude upper and lower sidebands corresponding to said DSB portion of said AM modulated IF picture carrier thereby compensating for said undesired phase modulation of said IF picture carrier and a corresponding buzz in said stereo signals which could otherwise be produced.

2. The apparatus recited in claim 1 wherein:

said filter means of said switching control signal generating circuit includes a tuned circuit having a resonant frequency greater than the frequency of said IF picture carrier and having a sloped attenuation response of a polarity opposite said given polarity over a predetermined bandwidth centered at the frequency of said IF picture carrier.

3. The apparatus recited in claim 2 wherein said tuned circuit comprises a parallel connected LC circuit.

4. The apparatus recited in claim 2 wherein:

said predetermined bandwidth is approximately $\pm 750$ KHZ.

5. The apparatus recited in claim 2 wherein:

said switching control signal generating circuit includes a limiter circuit.

6. The apparatus recited in claim 2 wherein:

said multiplier circuit also receives at said first input said AM modulated IF picture carrier and produces a demodulated video signal at said output.

7. A method for aligning a television receiver including an intermediate frequency (IF) signal channel having a passband for providing a multichannel IF sound signal and an IF picture signal including a picture carrier at its output, wherein at least said IF sound signal is applied to a first input of a multiplier and said IF picture carrier is applied to a second input of said multiplier, said IF picture carrier being derived by passing said IF picture signal through a bandpass filter, said method comprising:

tuning said bandpass filter to a frequency higher than the frequency of said picture carrier by an amount to substantially compensate for incidental phase modulation of said IF picture signal caused by said IF signal channel and thereby reduce buzz in said multichannel sound signal at the output of said multiplier.

* * * * *